United States Patent Office 3,561,826
Patented Feb. 9, 1971

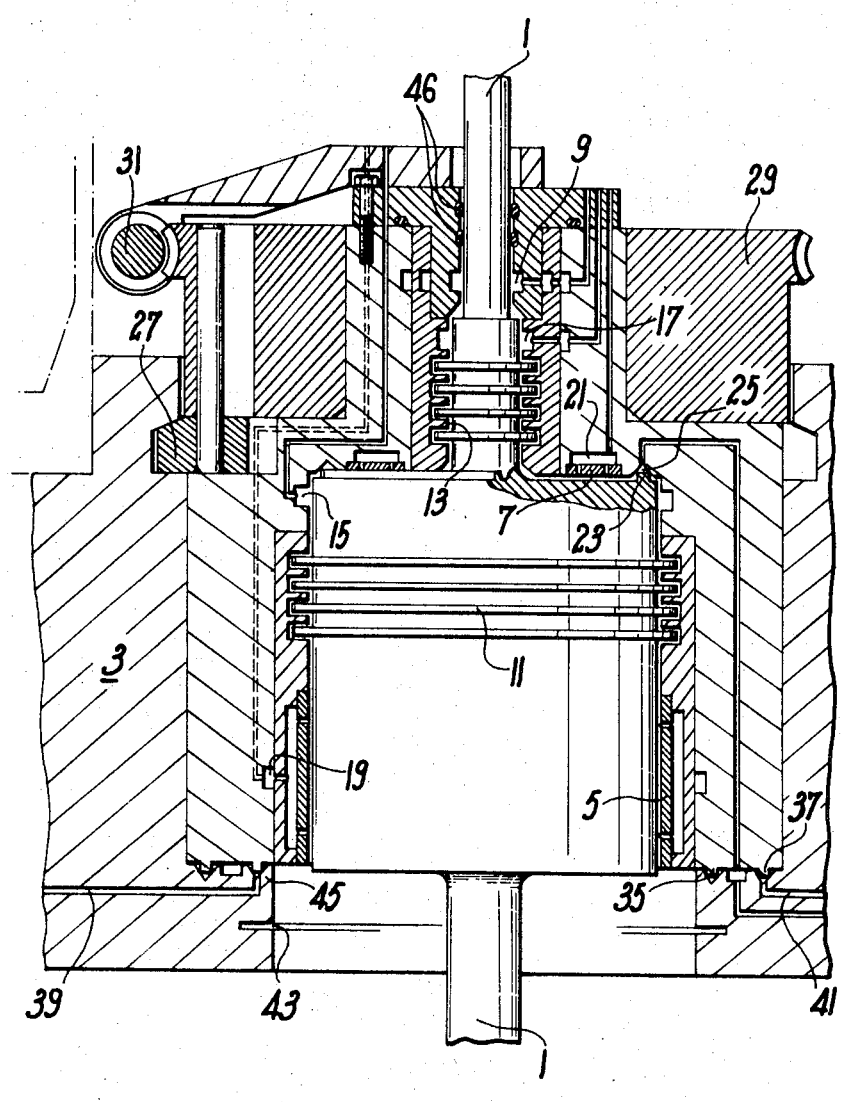

3,561,826
HERMETICALLY-SEALED TRANSFER UNIT
Claude Cavy, 6 Square Bernard Palissy, 78 Fontenay-le-Fleury, France; Pierre Rouge, 8 Boulevard de la Terrasse, 91 Orsay, France; and Roland Tissot, Chemin de la Ferme de Bellevue, 91 Arpajon, France
Filed Nov. 19, 1968, Ser. No. 777,067
Claims priority, application France, Dec. 11, 1967, 131,758
Int. Cl. F16c 1/24
U.S. Cl. 308—36.3          1 Claim

ABSTRACT OF THE DISCLOSURE

A rotary shaft passing through the wall of an atomic reactor is sealed against leaks around the shaft by two sets of baffles on the shaft spaced from each other and cooperating with a support mounted in the wall of the reactor receiving the shaft. A fluid film thrust bearing for the shaft is mounted in the support between the sets of baffles and a centering fluid bearing for the shaft is mounted within the support. A neutral gas under pressure is admitted to the shaft adjacent to the first set of baffles and between it and the exterior of the reactor with sealing means engaging the shaft and mounted in the support exterior thereof. Pumping means are provided around the shaft between the first set of baffles and the point of admission of the neutral gas. Second pumping means are provided opening around the shaft between the thrust bearing and the second set of baffles. A metallic seal is provided around the shaft engaging the support when the shaft is at rest.

---

This invention relates to hermetically-sealed through-passage assemblies which serve to transmit controlling inputs through a nuclear reactor vessel wall for the purpose of carrying out different controlled movements.

Among through-passage assemblies of this type, the invention is primarily concerned with those which make use of fluid-film seals.

The primary object of the invention is to improve said leak-tight through-passage assemblies in such a manner as to satisfy the various requirements encountered in nuclear engineering practice with greater effectiveness than has been the case up to the present time, especially insofar as said assemblies can now be readily replaced without thereby causing any interruption of leak-tightness and make it possible to dispense with all rotary seals as well as roller bearings and ball-thrust bearings.

The invention mainly consists of an assembly comprising a motion-transmission shaft adapted to pass through a support member which is rigidly fixed to the reactor vessel wall, said shaft being centered by means of a fluid-film bearing and positioned on a fluid-film thrust-bearing, characterized in that said shaft and said bearing are provided with two sets of baffles located in opposite relation on each side of said thrust-bearing, that a neutral-gas inlet and seals are provided between said shaft nad said bearing within that portion of the assembly which is located nearest the exterior of the reactor and that pumping means are disposed on the one hand after the first set of baffles between said thrust-bearing and said neutral-gas inlet and on the other hand between said thrust-bearing and the second set of baffles at the level of a metallic seal which ensures leak-tightness in the top position of abutment of said shaft.

The complementary description which now follows and the accompanying drawings will in any case serve to provide a more complete understanding of the invention and are given primarily by way of indication and not in any sense by way of limitation.

In the accompanying drawings, the single figure is an axial sectional view of a leak-tight through-passage assembly in accordance with the invention. As can be seen from this figure, the invention proposes to pass a rotary shaft 1 through a support member 3 which is secured to the wall of nuclear reactor containment vessel, especially in order to transmit into the interior of the reactor vessel the movement of rotation of a reduction-gear motor which is located outside the reactor vessel.

The shaft 1 is centered by means of a fluid-film bearing 5 and the thrust load on the shaft-end is carried by a fluid-film thrust-bearing 7. An inlet 9 for neutral gas is intended to provide a barrier against leakage from the thrust bearing 7.

The bearing 5 and thrust-bearing 7 are supplied, for example, with heavy water when the reactor is of the heavy-water-moderated type. However, the choice of the most effective fluid will be dependent on the problem considered and can in some cases be advantageously replaced by a gas.

The fluid within the bearing 5 is at a pressure $P+\Delta p$ and the fluid within the thrust-bearing 7 is at a pressure $P+\Delta p1$ with the relation $$P+\Delta p < P+\Delta p1$$

where P is the pressure which prevails within the reactor containment vessel.

In order to ensure good operation of the assembly, it must be ensured in all cases that the pressure at 17 is lower than the added pressures of the bearings 7 and 9.

Two sets of baffles 11 and 13 of the shaft 1 serve to reduce a proportion of the leakage occurring in the bearing 5 and thrust-bearing 7. A pumping means 15 located between the bearing 5 and the thrust-bearing 7 has the intended function of recovering a proportion of the leakage from said bearing and said thrust-bearing.

A pumping means 17 is located between the inlet 9 for the admission of neutral gas and the thrust-bearing 7 in such a manner as to recover a proportion of the leakage of fluid and of gas. Sealing rings 46 are provided for the purpose of limiting leakage of gas towards the exterior.

The bearing 5 and the thrust-bearing 7 are supplied with fluid only when a motion-transmission operation is to be carried out. On completion of this operation, the supplies of fluid to the inlet 19 of the bearing 5 and inlet 21 of the thrust-bearing 7 and then to the neutral-gas inlet 9 are cut off.

Under the action of the thrust on the shaft 1, said shaft is lifted to a slight extent and a metallic seal 23 then ensures leak-tightness. Vacuum pumping is then initiated at 25, thereby preventing any danger of leakage to the exterior.

The complete leak-tight through-passage assembly is maintained in position by means of movable sectors 27 which are actuated through the intermediary of a wheel 29 and a non-reversible worm 31 in accordance with an arrangement already described in Ser. No. 776,650, filed Nov. 18, 1968.

In order to ensure leak-tightness between the bushing 33 and the support member 3, provision is made on the lower end-face of said bushing 33 for two metallic seals 35 and 37 associated with leakage-pumping means 39 and 41.

The metallic joint 37 is clamped under the action of the sectors 27.

A groove 43 is formed in the support member 3 in order to ensure leak-tightness of the metallic seal 35. Said groove endows the portion 45 of said support member with a degree of flexibility and permits the pressure P which prevails within the reactor vessel to ensure a perfect contact between the metallic joint 35 and the support members 3.

Replacement of a leak-tight through-passage assembly is carried out after having cut off the fluid supply to the inlets 19, 21 and 9 and stopped the pumping means 15 and 17. The pumping means 25, 39 and 41 must remain in operation until a rotary drum has been placed in position so as to carry out the replacement according to the method in the patent application mentioned earlier.

The pumping means 25 is re-started as soon as the new through-passage assembly is in position and remains in operation until a further operation is carried out.

As is readily apparent, and as has in any case been brought out by the foregoing description, the present invention is not limited in any sense to the exemplified embodiment or to the particular application which has been more especially described with reference to the accompanying drawings but extends to all alternative forms.

What we claim is:

1. A hermetically sealed passage for transmission of control movements through the wall of an atomic reactor comprising a support fixed rigidly in the wall of the reactor, a rotatable shaft for transmitting movements passing through said support, a fluid film thrust bearing for said shaft, a fluid film centering bearing for said shaft, said bearings being mounted in said support, a first set of baffles between said shaft and said support, a second set of baffles between said shaft and said support, said thrust bearing being located between said sets of baffles, means for introducing a neutral gas to a portion of said shaft between said first set of baffles and the exterior of the reactor, sealing means engaging said shaft between said portion thereof and the exterior of the reactor, first pumping means opening around said shaft between said portion thereof and said first set of baffles, second pumping means opening around said shaft between said thrust bearing and said second set of baffles and a metallic seal around said shaft adjacent said second pumping means in sealing engagement with said support when said shaft is at rest.

References Cited

UNITED STATES PATENTS

| | | | |
|---|---|---|---|
| 1,315,822 | 9/1919 | Doran | 308—36.3 |
| 1,458,489 | 6/1923 | Lee | 277—56 |
| 2,004,563 | 6/1935 | Bogoslowsky | 277—56 |
| 2,740,647 | 4/1956 | Van Pelt | 277—56 |
| 2,899,245 | 8/1959 | Michel | 308—36.3 |
| 3,195,858 | 7/1965 | Schwarz | 308—36.3 |

FRED C. MATTERN, JR., Primary Examiner

W. S. RATLIFF, JR., Assistant Examiner

U.S. Cl. X.R.

277—56